United States Patent [19]
Drexel et al.

[11] Patent Number: 5,285,673
[45] Date of Patent: Feb. 15, 1994

[54] METHOD FOR IN-LINE CALIBRATION VERIFICATION OF MASS FLOW METERS

[75] Inventors: Charles F. Drexel, Rolling Hills; Daniel T. Mudd, Long Beach, both of Calif.

[73] Assignee: DXL International, Inc., Torrance, Calif.

[21] Appl. No.: 789,364

[22] Filed: Nov. 8, 1991

Related U.S. Application Data

[63] Continuation-in-part of Ser. No. 661,570, Feb. 26, 1991, abandoned.

[51] Int. Cl.$^5$ .................... G01F 1/68; G01F 25/00
[52] U.S. Cl. ............................. 73/3; 73/204.27
[58] Field of Search ............ 73/204.16, 204.23, 204.25, 73/204.26, 204.27, 204.3

[56] References Cited

U.S. PATENT DOCUMENTS

| | | | |
|---|---|---|---|
| 2,729,976 | 1/1956 | Laub | 73/204.16 |
| 3,438,254 | 4/1969 | Seeley | 73/204.25 |
| 4,478,077 | 10/1984 | Boher et al. | 73/204.16 |
| 4,693,116 | 9/1987 | Miura et al. | 73/204.16 |
| 4,783,996 | 11/1988 | Ohta et al. | 73/204.26 |
| 4,922,233 | 5/1990 | Twerdochlib | 73/204.25 |

*Primary Examiner*—Herbert Goldstein
*Attorney, Agent, or Firm*—Spensley Horn Jubas & Lubitz

[57] ABSTRACT

An apparatus for verifying the calibration of a flow meter contains a flow sensor assembly which has a flow tube defining an axial fluid path through the flow sensor assembly; an upstream temperature sensor in thermal contact with the flow tube; a downstream temperature sensor in thermal contact with the flow tube, the two sensors being operationally connected to a means for producing an output in response to a temperature difference between the first and second sensors; and means for asymmetrically transferring heat to the first and second temperature sensors independently of fluid flow through the flow tube. The calibration of the flow meter's thermal and electronic systems is verified by measuring the flow meter's output in response to a first asymmetric heat transfer to the upstream and downstream temperature sensors when the flow meter is calibrated. The output of the flow meter in response to a second asymmetric transfer to the upstream and downstream sensors is subsequently measured and comparison of the two readings verifies whether the flow meter's thermal and electronic systems remains calibrated.

28 Claims, 5 Drawing Sheets

METHOD FOR IN-LINE CALIBRATION VERIFICATION OF MASS FLOW METERS

CROSS REFERENCE TO RELATED APPLICATION

This application is a continuation-in-part of application Ser. No. 07/661,570 filed Feb. 26, 1991 for "Apparatus And Method For In-Line Calibration Verification Of Mass Flow Meters", now abandoned.

BACKGROUND OF THE INVENTION

1. Field of the Invention

This invention relates to the mechanical arts. In particular, it relates to instruments for measuring and controlling the flow of fluids, such as gases.

2. Discussion of Relevant Art

There have been developed in the art a variety of instruments for measuring and controlling the mass flow of gases ranging from below 5 standard cubic centimeters per minute (SCCM) to more than 500,000 SCCM. The prevalent design of such instruments requires that the flow of the gas be divided into two or more paths.

In a typical flow meter, a small amount of gas is routed through a flow sensor assembly, where the mass flow is measured, while most of the flow is routed through a splitter section located in parallel with the flow sensor assembly. When a flow meter is operationally connected with a valve, the flow meter can be used to control, as well as measure, the flow of gases.

The flow sensor assembly contains a flow tube that carries two resistance thermometers on its outside surface. The resistance thermometers form two legs of an electronic bridge circuit; the other two legs are fixed resistors. The flow sensor assembly must be carefully manufactured, so that the two resistance thermometers are as identical as possible in electrical and thermal characteristics.

When a voltage is applied across the bridge circuit, current passes through the resistance thermometers causing them to self-heat. Since they are nearly identical in electrical and thermal characteristics, the temperature of each resistance thermometer increases by the same amount, causing the electrical resistance in each to increase by the same amount—for so long as there is no gas flow through the flow tube. As soon as gas flow occurs, the upstream resistance thermometer is cooled by heat transfer to the flowing gas and the downstream resistance thermometer is either heated or cooled to a lesser extent. The average temperature of the upstream resistance thermometer will now be different than the average temperature of the downstream resistance thermometer and the bridge circuit will show an imbalance due to the differences in their resistance.

During manufacture, mass flow meters are calibrated to produce a specific output for a given flow of a specific gas. However, over a period of time, the mass flow meters become uncalibrated and their output changes. This phenomenon, called calibration drift, results in inaccurate measurement and control of the gas flow. Calibration drift can occur if the properties of the flow meter's thermal or electrical systems change from the time of calibration. Common sources of calibration drift include changing thermal conductivity of foams, plastics, wire insulations and epoxies used in fabricating the mass flow meter as they outgas and age; changing resistance of the resistance thermometers as residual stresses are relieved due to repeated heating and cooling of the flow sensor assembly; random minor changes in the geometry of the flow sensor assembly changing the heat transfer to and from the flow sensor assembly; drift in the electronics that amplify and deliver the sensor signal; physical damage to the calibration section; and a buildup of contaminants inside the flow tube impeding heat transfer to the gas and adding additional mass to be heated or cooled during transient flow conditions.

The measurement and control of the flow of gases is important in many industries. During the manufacture of semiconductors, for example, many processes require a precise reaction of two or more gases under carefully controlled conditions. The extreme precision required to make solid state memories, where millions of transistors are deposited on an area the size of a fingernail, could not be possible without the accurate control of the process gases.

As the size of individual devices in integrated circuits has shrunk from several microns to less than one, and as the number of devices per circuit has increased from a few thousand to several million, the accuracy of control of the equipment used to manufacture the devices has become increasingly important. If a flow meter is uncalibrated, the process gases are not supplied in the proper amounts and the resulting integrated circuits exhibit degraded performance.

It is not always obvious which step in the complex manufacture of semiconductors is responsible for this degraded performance. Consequently, there is a need for a reliable and cost effective apparatus and method for in-line calibration verification of mass flow meters.

Presently, semiconductor manufacturers use four techniques to ensure the accuracy of mass flow meters:

1. Inspecting and testing the silicon wafers after their manufacture has been completed;

2. Attaching a reference meter to the end of a gas-line containing an in-line flow meter, flowing gas through the in-line and reference flow meters and then comparing the output of the reference meter to the output of the in-line flow meter;

3. Removing the flow meter from the gas-line and replacing it with a freshly calibrated flow meter; or 4. If the manufacturing process is conducted in a vacuum chamber, sealing the chamber discharge and measuring the rise in the pressure and temperature of the known volume of the chamber, after a specific time, during which the flow rate of a gas into the chamber remains constant. The flow rate calculated for the known conditions can then be compared to the flow rate indicated by the flow meter.

The second technique involves establishing a known flow of gas through the flow meter, as a reference flow, and observing the flow meter's output. This technique suffers from several drawbacks. Access to the fluid flow system is often limited. In addition, the process of attaching and subsequently removing the reference meter can cause problems with the purity of the reactant gases.

The extreme accuracy required in the fabrication of solid state devices has led some manufacturers to adopt the third technique to ensure that there has been no change in the calibration of their flow meters. Based on the possibility that the flow meter may have become uncalibrated, this technique requires the scheduling of mass flow meters for periodic removal and shipment back to the manufacturer for recalibration.

Typically, the removal of a mass flow meter from a high purity gas line will require hours or days of purging the gas line and the associated equipment to return the system to an acceptable level of purity, before the flow meter and associated equipment can be put back into service. The cost of shutting down the equipment can dwarf the more obvious cost and effort associated with the shipment and recalibration of the mass flow meter itself.

SUMMARY OF THE INVENTION

In accordance with the invention, there is provided an apparatus and method for the in-line verification of the calibration of a flow meter, which overcome the drawbacks of known techniques. The flow meter contains a flow sensor assembly which has a flow tube defining an axial fluid path therethrough; an upstream temperature sensor in thermal contact with the flow tube; a downstream temperature sensor in thermal contact with the flow tube, the two sensors being operationally connected to a means for producing an output in response to a temperature difference between the two sensors; and means for asymmetrically transferring heat to the two temperature sensors independently of fluid flow through the flow meter.

In some embodiments, the asymmetric heat transfer is a continuous addition of or removal of heat at a constant rate, while in other embodiments, the asymmetric heat transfer is an addition of or removal of a fixed quantity of heat nearly instantaneously. Representative heat transferring means which add heat include thermal-electric devices, such as resistance coils, or thermal-thermal devices, such as heat pipes. A section of the flow tube may also be directly heated by means of resistance heating. Representative heat transfer means which remove heat include thermal-electric devices which take advantage of the Peltier effect, or thermal-thermal devices, such as heat pipes. Temperature sensors may include, for example, resistance thermometers, thermocouples, or thermistors.

The calibration of the flow meter is verified by measuring its output in response to a first, asymmetric transfer of heat between the temperature sensors when the flow meter is calibrated. The output of the flow meter in response to a second asymmetric transfer of heat between the temperature sensors is subsequently measured when its calibration is to be verified. A comparison of the two measurements reveals whether the thermal and electrical systems of the flow meter remain calibrated at the time of the subsequent measurement.

DETAILED DESCRIPTION OF THE PREFERRED EMBODIMENT

As required, details of illustrative embodiments of the invention are disclosed. However, it is to be understood that these embodiments merely exemplify the invention which may take forms different from the specific embodiments disclosed. For example, while the detailed description of the preferred embodiments describes flow meters, per se it is to be understood that the flow meter can be combined with a valve and used to control the flow of a fluid. Consequently, unless otherwise clearly indicated, the term flow meter as used in the specification and claims includes both flow meters and flow controllers. Structural and functional details are not necessarily to be interpreted as limiting, but as a basis for the claims.

Figure 1:
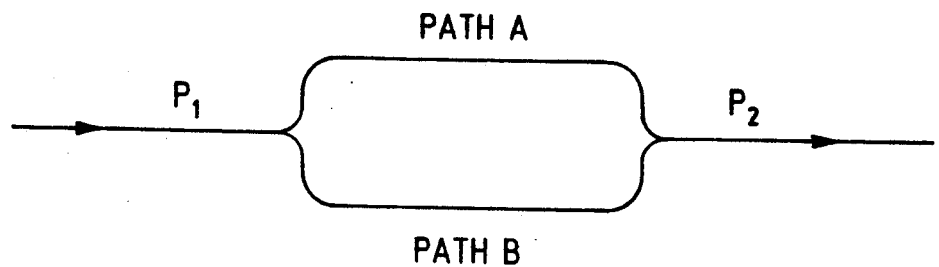
FIG. 1 is a schematic representation of the flow of fluid through the measuring section of a flow meter.

Referring to FIG. 1, fluid paths A and B constitute the flow of a fluid through the measuring section of a flow meter from the inlet $P_1$ to the outlet $P_2$. The line labelled PATH A represents fluid flow through the flow sensor assembly and the line designated PATH B represents fluid flow through the flow splitter section.

In the particular embodiments illustrated herein, PATH A depicts the fluid flow through a flow sensor assembly containing a flow tube of sufficient elongation to assure laminar flow at the desired flow rate. PATH B depicts the fluid flow through a flow splitter which is also constructed and proportioned to assure laminar flow. Representative flow meters are described in U.S. Pat. Nos. 3,938,384 and 4,524,616, which patents are herein incorporated by reference.

Figure 2:
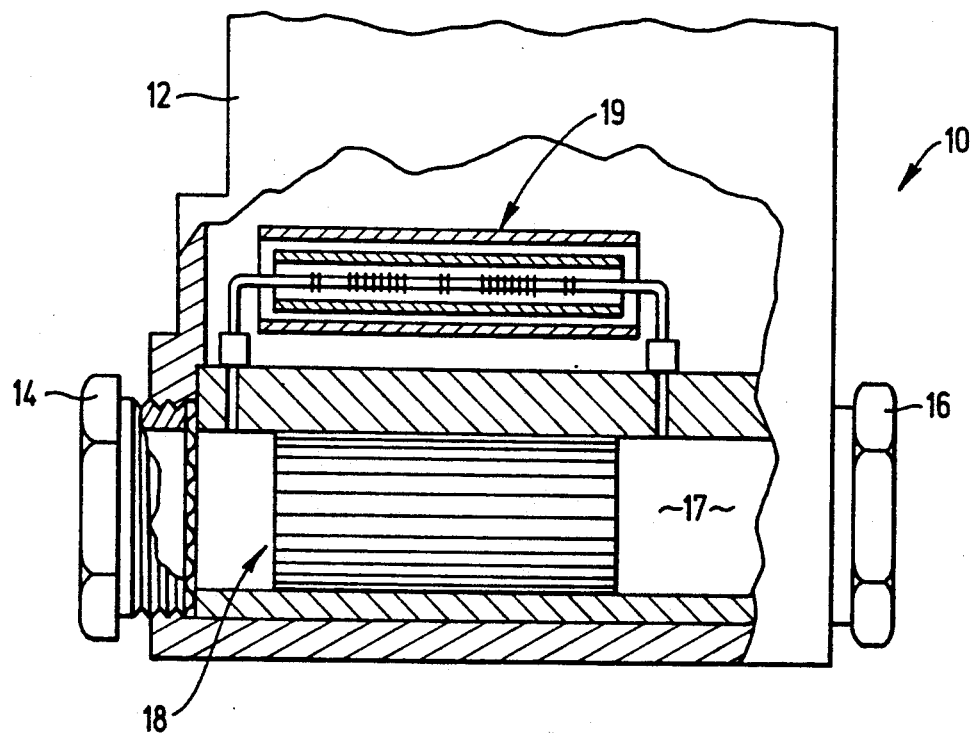
FIG. 2 is an illustration, in partial cross-section, of a flow meter, including a flow sensor assembly.

Referring to FIG. 2, a flow meter 10 has an elongated housing 12 with a fluid inlet 14, a fluid outlet 16 and an axial longitudinal passage 17 between the two. The axial passage 17 contains a flow splitter section 18 and is operationally connected in parallel to a flow sensor assembly 19 which measures the rate of the fluid flow.

Figure 3:
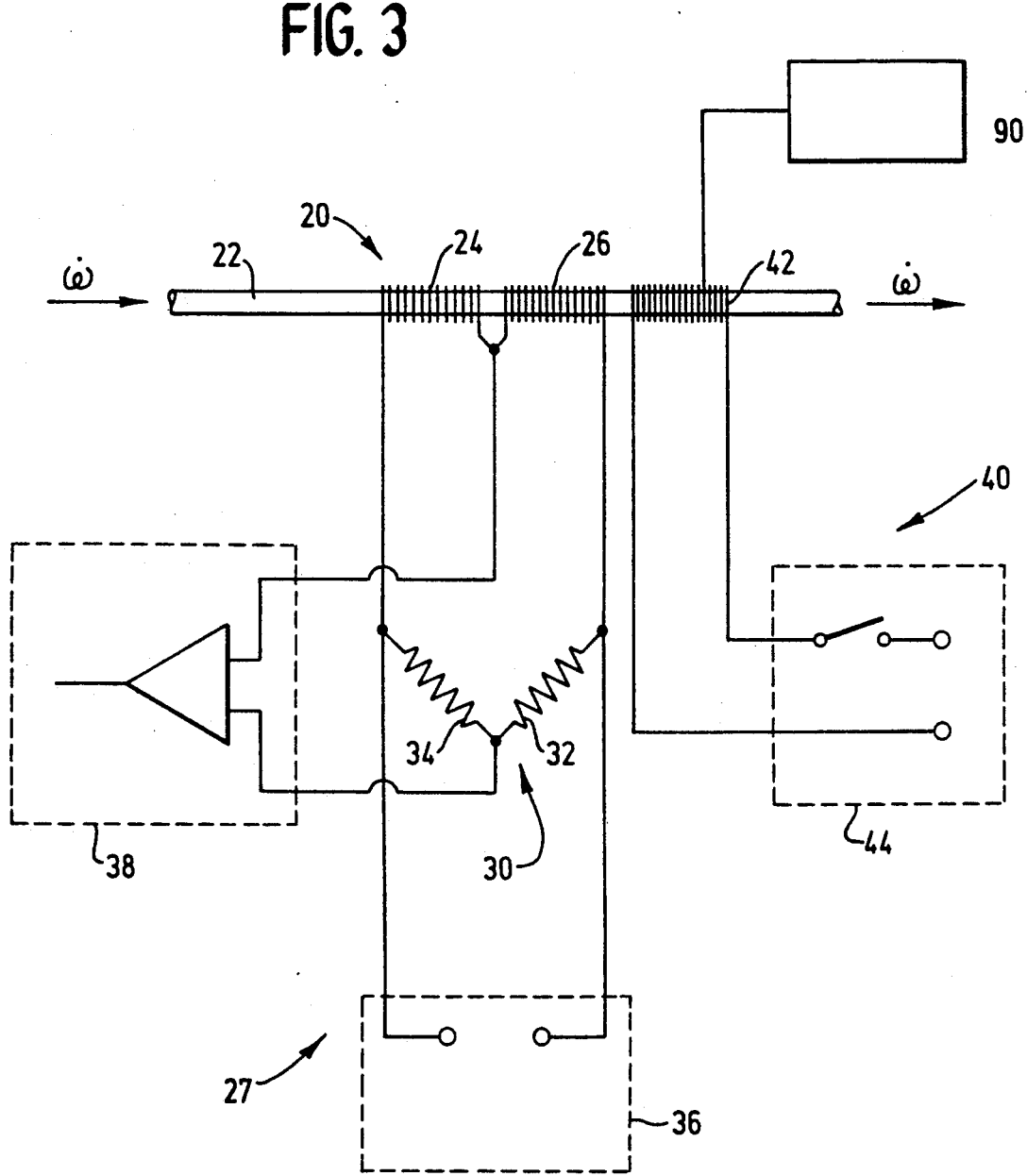
FIGS. 3–9 are schematic illustrations of portions of flow sensor assemblies including means for in-line calibration verification in accordance with various alternative embodiments of the invention.

Referring now to FIG. 3, a portion of a flow sensor assembly 20 is illustrated. The flow sensor assembly 20 includes a flow tube 22 defining an axial fluid path through the assembly. Typically, the flow tube 22 is very thin and elongated, and in this exemplary embodiment has an inside diameter of about 0.25 mm and a length of about 100 mm.

In thermal contact with the flow tube 22 are an upstream resistance thermometer 24 and a downstream resistance thermometer 26. The resistance thermometers, 24 and 26, are self-heating wire coils wound around the outside surface of the flow tube 22.

The resistance thermometers, 24 and 26, are operationally connected to a means 27 for producing an output in response to a temperature difference between the upstream and downstream resistance thermometers. The resistance thermometers, 24 and 26, form two legs of an electronic bridge circuit 30. The other two legs are formed by fixed resistors 32 and 34.

The resistance thermometers, 24 and 26, are heated by current supplied to the bridge circuit 30 by a first electrical power source 36. The output of the bridge circuit 30 is amplified by signal amplification section 38. The amplified output is used for monitoring and controlling the gas flow through the flow meter.

In operation, the relatively cool gas to be measured enters the flow sensor assembly 20, at a location that is geometrically and thermally closer to the upstream resistance thermometer 24, than it is to the downstream resistance thermometer 26. As a result of this geometry, the gas absorbs heat from the flow tube in an asymmetric manner With respect to the two resistance thermometers, 24 and 26. This causes the temperature distribution along the flow tube 22 to shift in an asymmetric manner, changing the temperature difference between the upstream and downstream thermometers, 24 and 26. The magnitude of the shift in the temperature distribution along the flow tube 22 and the temperature difference between the resistance thermometers, 24 and 26, is directly related to the capacity of the gas to absorb heat and is a function of the mass flow of the gas through the flow tube.

In accordance with the invention, in-line calibration verification is made possible by incorporating a means for asymmetrically transferring heat to the resistance thermometers, independently of fluid flow through the flow meter. The heat transfer means changes the temperature distribution along the flow tube, between the two resistance thermometers, either by the continuous transfer of heat at a constant rate or by the transfer of a fixed quantity of heat nearly instantaneously. The asymmetric heat transfer can be either positive—heat added to the flow tube—or negative—heat removed from the flow tube. Representative heat transfer means which add heat include thermal-electric devices, such as resistance coils, or thermal-thermal devices, such as heat pipes. Representative heat transfer means which remove heat include thermal-electric devices which take advantage of the Peltier effect, or thermal-thermal devices, such as heat pipes.

Changes in the thermal or electrical characteristics of the flow meter, which cause calibration drift in the flow meter's output in response to a gas flow, will also cause a calibration drift in the flow meter's output in response to the asymmetric heat transfer. The temperature difference between the upstream resistance thermometer 24 and the downstream resistance thermometer 26 is affected by the direction of heat transfer—whether heat is added or removed—and the location of the heat transfer means 40. In addition, the magnitude of the temperature difference between the two resistance thermometers, 24 and 26, is proportional to the rate of heat transferred, when the heat is transferred continuously, or to the quantity of heat transferred, when the heat is transferred nearly instantaneously.

Heat addition thermally closer to the downstream resistance thermometer 26, than to the upstream resistance thermometer 24, and heat removal thermally closer to the upstream resistance thermometer, than to the downstream resistance thermometer, lowers the temperature of the upstream thermometer relative to the downstream thermometer. Conversely, heat addition thermally closer to the upstream resistance thermometer 24, than the downstream resistance thermometer 26, and heat removal thermally closer to the downstream resistance thermometer, than the upstream thermometer, raises the temperature of the upstream thermometer relative to the downstream thermometer.

In preferred embodiments, the heat transfer means 40 lowers the temperature of the upstream thermometer 24 relative to the downstream thermometer 26. The temperature difference resulting from such embodiments increases the flow meter's positive output, as the rate of heat transfer is increased. Since flow meters generally have only a limited capability to display negative outputs—typically less than 15% of their capability to display positive outputs—these embodiments allow calibration measurements taken at zero or near zero flow conditions to take advantage of the flow meter's large positive output capability and thus provide for increased accuracy.

The heat transfer means 40 asymmetrically adds heat to the upstream and downstream resistance thermometers, 24 and 26. The means 40 is a self-heating calibration coil 42 wound around the flow tube 22. The coil 42 is operationally connected to a second electrical power source 44. The power source 44 supplies the electrical power that is converted into heat energy by the calibration coil 42 and asymmetrically transferred to the resistance thermometers, 24 and 26, through flow tube 22.

The calibration coil 42 is located downstream of the downstream resistance thermometer 26. It is preferably located as close to the downstream thermometer 26 as possible. This maximizes the heat which is transferred to the downstream thermometer 26 and minimizes the heat which is lost to the area surrounding the flow sensor assembly 20. In those embodiments where both the downstream resistance thermometer 26 and the calibration coil 42 are made of insulated wire, the calibration coil can be wound directly on top of the downstream resistance thermometer.

In some embodiments, the calibration coil 42 is formed of resistance thermometer wire. In order to facilitate the control of the power applied through the wire, it is desirable that the wire have a resistance of from about 10 to about 30,000 ohms, preferably about 100 to 1,000 ohms, most preferably about 600 ohms. By measuring both the voltage and amperage supplied to the calibration coil, the power supplied to the resistance thermometers, 24 and 26, is determined.

In other embodiments, the calibration coil 42 is made of a wire, such as Evanohm, having a low temperature coefficient, so that the resistance of the coil does not change appreciably with temperature. The temperature coefficient is substantially zero over a temperature range of from about zero to about 250 degrees Fahrenheit. In these embodiments, the power is easily measured and controlled, simply by monitoring, either voltage or amperage to the coil. Monitoring both is not required.

Figure 4:
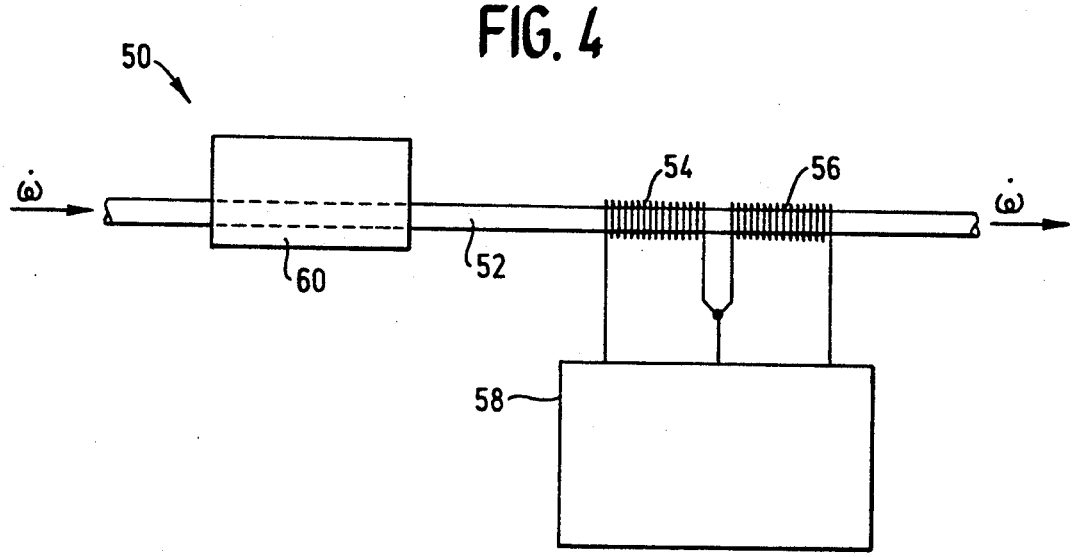

Referring now to FIG. 4, there is shown another embodiment of a portion of a flow sensor assembly 50 in accordance with the invention. The flow sensor assembly 50 includes a flow tube 52 defining an axial fluid path through the assembly. In thermal contact with the flow tube 52 are an upstream resistance thermometer 54 and a downstream resistance thermometer 56. The upstream resistance thermometer 54 and the downstream resistance thermometer 56 are operationally connected to a means 58 for producing an output in response to a temperature difference between the upstream and downstream thermometers.

A means 60 for asymmetrically removing heat from the resistance thermometers, 54 and 56, independently of fluid flow through the flow meter, is located upstream of the upstream thermometer. The heat removal means 60 changes the temperature distribution along the flow tube 52 and lowers the temperature of the upstream thermometer 54 relative to the downstream thermometer 56. The heat removal is typically made by either a thermal-electric device or a thermal-thermal device. Representative thermal-electric devices include devices that take advantage of the Peltier effect, i.e. devices where current is sent through a circuit containing a thermocouple, so that heat is given out at one junction, and absorbed at the junction in thermal contact with the flow tube 22. Representative thermal-thermal devices include heat pipes.

Drift in the calibration of the flow meter is detected by measuring the output of the flow meter in response to a first, asymmetric heat transfer to the resistance thermometers, when the flow meter is calibrated. The output of the flow meter in response to a second, asymmetric heat transfer to the resistance thermometers is subsequently measured. The magnitude of any change in the calibration of the flow meter, due to changes in the flow meter's thermal and electronic characteristics, is revealed by a comparison of the two measurements.

In some embodiments, the heat is transferred at substantially identical, constant rates, until the flow meter's output stabilizes at a steady state value, during both the first and second measurements. In other embodiments, substantially identical quantities of heat are transferred nearly instantaneously, during both the first and second measurements. Since the heat transfer during the first and second measurements are substantially identical, it is not necessary to measure the magnitude of the heat transfer at the constant rate or to measure the total amount of heat transferred nearly instantaneously.

In these embodiments, the first and second outputs are substantially identical, so long as the thermal and electrical systems of the flow meter remain calibrated. Any difference in the outputs is an indication that the flow meter is no longer calibrated and an indication of the magnitude of the calibration drift.

In other embodiments, the heat transfers are not substantially identical, but have different magnitudes. In these embodiments, it is necessary to measure the heat transferred during each measurement, so that the variation between heat transfers can be compensated for, when comparing the first and second outputs.

Since the output of the flow meter is proportional to the magnitude of the heat transfer, a linear adjustment factor can be calculated to compensate for output readings resulting from transfers of different magnitudes. In these embodiments, the outputs are compared, after the measurements have been normalized using the ratio of their different magnitudes.

In some embodiments, for ease of comparing the first and second measurements, heat is continuously transferred at a constant rate. In these embodiments, the output from the amplification section is allowed to approach a steady state value, prior to being recorded for comparison purposes.

Other embodiments are particularly useful for detecting an out-of-calibration condition due to the internal clogging of the flow tube. A known quantity of heat is transferred in a nearly instantaneous pulse to the flow tube, when the first and second measurements are made. The pulse preferably lasts from about 0% to about 100% of one thermal time constant for the system. More preferably, the pulse lasts less than about 5% of one time constant.

When pulses are used, the output of the amplification section 38 does not approach a steady state, but the output is a transient value with time. In these embodiments, the peak value is, typically, recorded for comparison purposes.

The peak value of the transient output is influenced by the thermal mass to or from which heat is transferred. Consequently, if between the first and second measurements, the interior of the flow tube begins to become clogged with contaminants, the thermal mass of the contaminants is added to the total thermal mass to be heated. As a result, if the flow tube has begun to become clogged with contaminants, the peak value of the second measurement is less than first peak value.

If a calibration shift is detected, the flow meter can be replaced. Alternatively, adjustments in the gain and linearity of the flow meter's output can be made to reestablish calibration.

It is an advantage of the apparatus and method in accordance with this invention, that they do not require a flow of gas through the flow meter, as a reference. However, in those embodiments where it is not practical or desirable to cut off the fluid flow, the rate of flow of fluid through the flow tube is held constant during both the first and second measurements.

Figure 5:
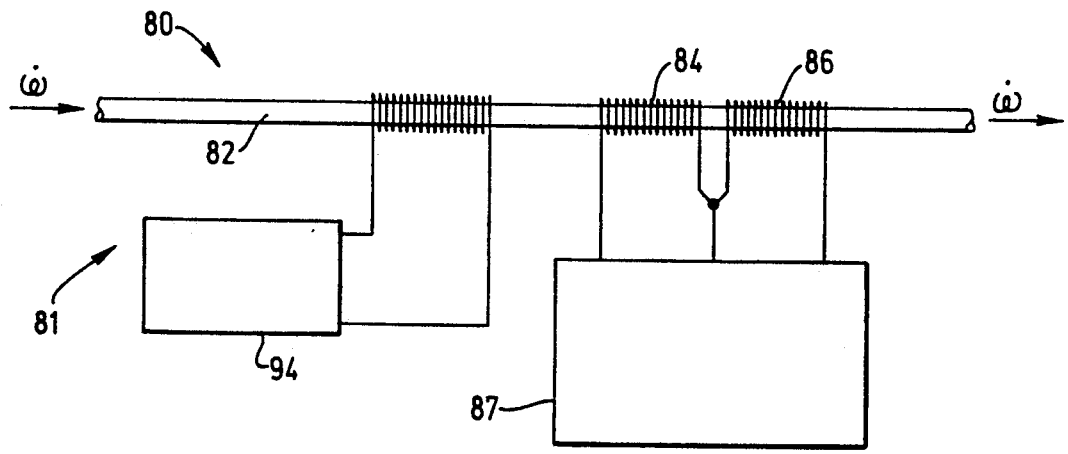

In some embodiments, the means for asymmetrically transferring heat raises the temperature of the upstream resistance thermometer relative to the downstream resistance thermometer. Referring to FIG. 5, there is shown a flow sensor assembly 80 containing a means 81 for asymmetrically transferring heat, to an upstream resistance thermometer and a downstream resistance thermometer, independently of fluid flow through the flow meter.

The flow sensor assembly 80 includes a flow tube 82 defining an axial fluid path through the assembly. In thermal contact with the flow tube 82 are an upstream resistance thermometer 84 and a downstream resistance thermometer 86, operationally connected to a means 87 for producing an output in response to a temperature difference, between the two thermometers.

The heat transfer means 81 is a self-heating, calibration coil 92 wound around the flow tube 82. A second electrical power source 94 is used to heat the calibration coil 92.

The calibration coil 92 is located upstream of the upstream resistance thermometer 84. It is preferably located as close to the upstream resistance thermometer 84 as possible. This maximizes the heat which is transferred to the upstream thermometer 84 and minimizes the heat which is lost to the area surrounding the flow sensor assembly 80. In those embodiments where both the upstream resistance thermometer 84 and the calibration coil 92 are made of insulated wire, the calibration coil can be wound directly on top of the upstream resistance thermometer.

When the heat transfer means 81 raises the temperature of the upstream resistance thermometer 84 relative to the downstream resistance thermometer 80, the flow meter's output decreases, as the rate of heat addition increases. Therefore, measurements taken at or near the maximum operating flow of the flow meter, take advantage of the full range of the flow meter's signal amplification, and provide the greatest accuracy.

To verify the calibration of a flow meter using the embodiment shown in FIG. 5, a calibrated flow meter is set to deliver a first, flow at or near its maximum rate. Once the flow rate has stabilized, the flow is fixed at the stabilized rate and the calibrated flow meter's output is measured. Heat is then transferred, at an increasing rate, to reduce the calibrated flow meter's output, until a first output, typically zero, is reached.

To verify that the flow meter remains calibrated, the flow meter is subsequently set to deliver a flow rate which is substantially identical to the first rate. Once the rate has stabilized, it is fixed at the stabilized rate and heat is again transferred, at an increasing rate, until an output, which is the same as the first output, is reached. A comparison of the rate of heat transfer necessary to obtain the same outputs reveals any change in the calibration of the flow meter, due to changes in the flow meter's thermal and electronic characteristics, and the magnitude of the change.

Referring again to FIG. 3, it is an advantage of this embodiment, that it is readily adapted to measure the temperature of the flow tube 22. If the calibration coil 42 is fabricated of resistance thermometer wire, then the second electrical power source 44 can supply the power necessary to cause the calibration coil to become a third resistance thermometer. The temperature of the flow tube 22, at the calibration coil 42, is measured by operationally connecting the calibration coil to a means 90 for measuring resistance through the calibration coil. When the resistance through the calibration coil 42 is measured at a known temperature, a comparison of this resistance to the resistance through the coil at a subsequent time enables the coil's subsequent temperature to be determined.

Such embodiments can provide another, relatively rough, method verifying whether the flow meter's thermal systems are calibrated. Calibration is verified by measuring the ambient temperature, using conventional techniques, and the temperature of the calibration coil, when the flow meter is calibrated and determining the difference between the two temperatures. At the time of verification, the ambient temperature and the temperature of the calibration coil are again measured and their difference determined. A comparison of the temperature difference between the ambient temperature and the temperature of the calibration coil at the time of calibration and at the time of verification provides a relatively rough indication of whether the flow meter's thermal system remains calibrated.

The embodiment where the calibration coil 42 acts as a temperature sensor has uses other than in the in-line calibration verification of mass flow meters. For example, it is a desideratum to measure the temperature of the process gases during the manufacture of semiconductors. Temperature data can be used to refine flow meter accuracy, by allowing thermal compensations of the flow meter's output to correct for temperature effects on the flow meter's electronics and on the variation in specific heat that some gases display with temperature. This can now be accomplished with the apparatus in accordance with this invention.

In some mass flow meters using upstream and downstream resistance thermometers, the flow sensor assembly includes an independent heater between the two resistance thermometers. Typically, the heater is operated at a constant power distribution and the two thermometers are operated at a very low power level, so that they do not add appreciable heat to the system. Such a system is shown in FIG. 6.

Figure 6:
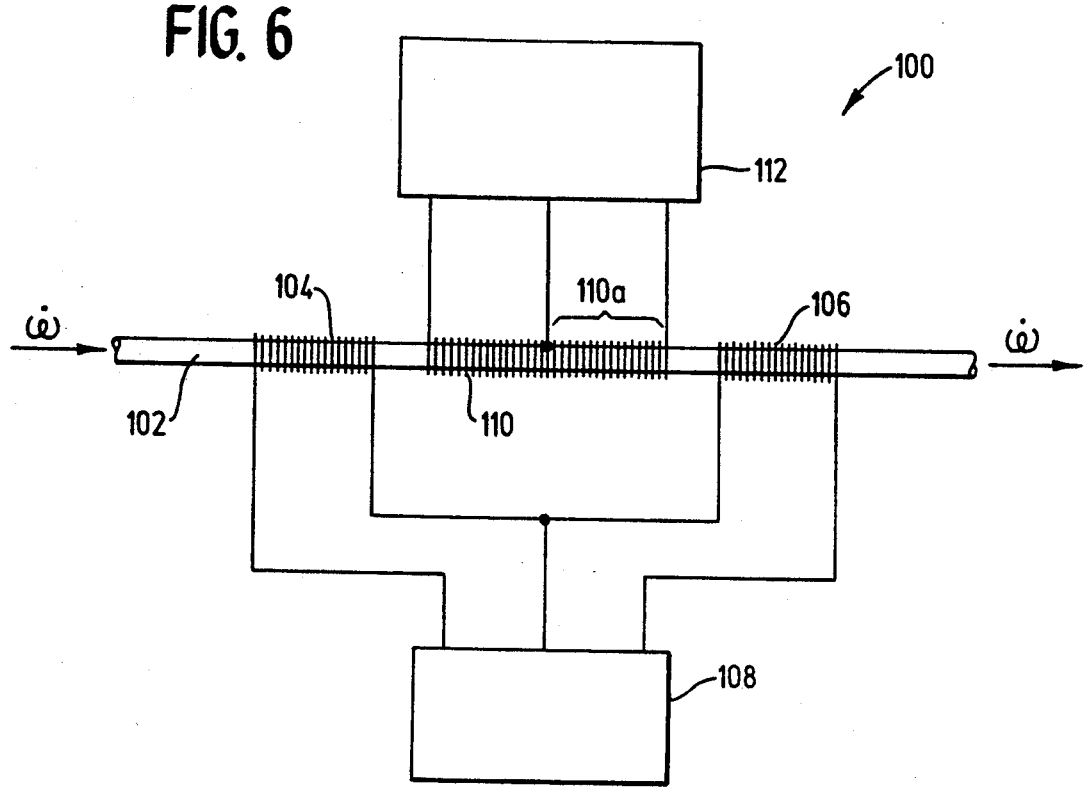

The flow sensor assembly 100 shown in FIG. 6 includes a capillary flow tube 102. Wound around the outer surface of the tube 102 and spaced apart along the length thereof are upstream and downstream resistance thermometers 104 and 106, respectively, which serve as flow sensing elements. The resistance thermometers 104 and 106 are coupled to a means 108 for producing an output that is a function of the temperature differential between the two areas of the outer surface of the tube about which the resistance thermometers are wound.

Disposed symmetrically between the resistance thermometers 104 and 106 and in close proximity thereto, is an independent electrical heating coil 110 wound about the outer surface of the tube 102. The heating coil is energized by a power supply 112.

As already explained, when there is no flow within the capillary tube, the temperature profile is symmetrical and the two thermometers are heated to the same temperature and therefore have the same electrical resistance. The resulting signal from the output producing means 108 is zero, indicating no flow in the capillary tube. When gas flows within the tube, the first resistance thermometer 104 is cooled and the second thermometer 106 is heated by heat transfer to and from the gas stream so that the temperature profile becomes asymmetric. Accordingly, the signal from the output producing means 108 is no longer zero, with the magnitude of the output being proportional to the temperature difference measured by the resistance thermometers 104 and 106 and therefore a function of mass flow.

In accordance with the invention, the embodiment of FIG. 6 also provides for automatic self-calibration. In this connection, there is included means for providing an asymmetric thermal gradient or temperature profile which appears to the sensor as a flow of gas. In the example of FIG. 6, the asymmetric temperature profile producing means comprises a section 110a of the heating coil which, in the example under consideration, is closer to the downstream coil 106 than the upstream coil 104. By only heating the section 110a, the resistance thermometers 104 and 106 will be at different temperatures, thereby simulating mass flow for calibration and calibration verification purposes. It will be obvious, of course, that instead of a means for adding heat asymmetrically, heat may be asymmetrically removed to achieve the same result.

Figure 7:
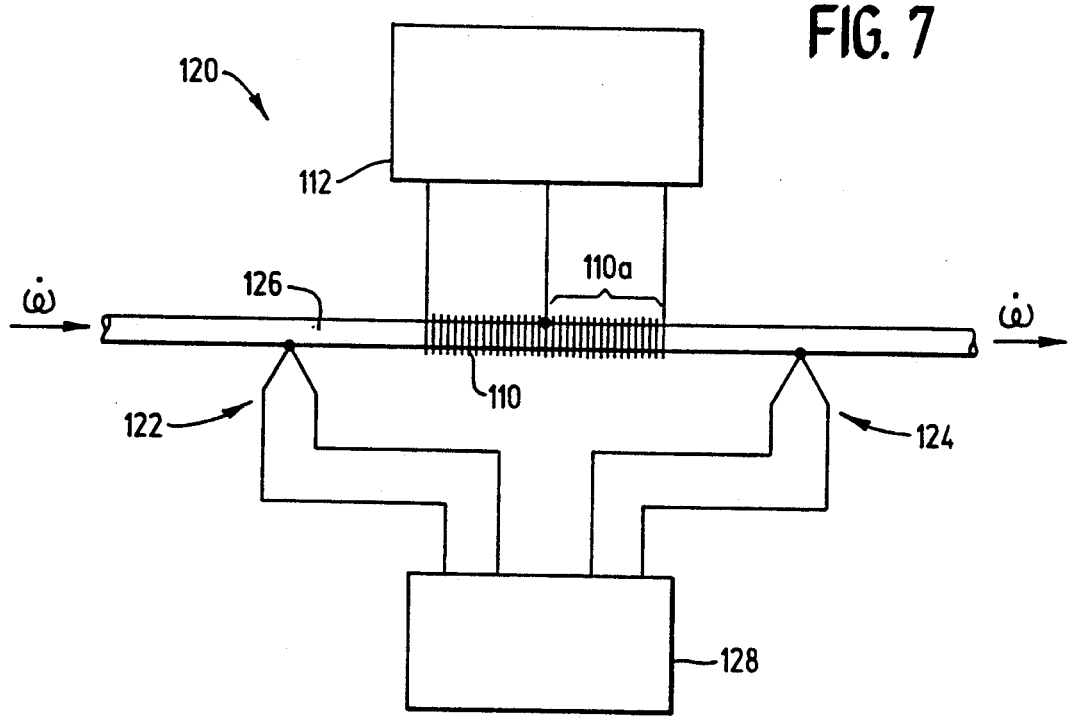

In the embodiments described so far, wire coil resistance thermometers are used as the primary flow sensing elements. It will be evident, however, to those skilled in the art that other types of temperature sensors may be utilized. For example, FIG. 7 shows a flow sensor assembly 120 in accordance with yet another embodiment identical in all respects to that of FIG. 6 except that the example of FIG. 7 includes an upstream temperature sensor in the form of a thermocouple 122 and a downstream temperature sensor comprising a thermocouple 124. The measuring or hot junctions of the thermocouples are secured to the outer surface of the capillary flow tube 126. The thermocouples 122 and 124 are coupled to a means 128 for measuring the voltage (or other electrical parameter) produced as a result of the heating (or cooling) of the thermocouple measuring junctions and for producing an output indicative of the temperature difference between those junctions. The means 128 includes measuring, standardization and other circuitry, all well known in the measuring and testing arts. It will further be appreciated by those skilled in the art that temperature sensors in the form of thermistors may be used in place of the thermocouples 122 and 124. Since neither thermocouples nor thermistors can be self-heated, a heater means is necessary. As in FIG. 6, the embodiment of FIG. 7 includes a heating coil 110 disposed symmetrically between the temperature sensors 122 and 124 and powered by the power supply 112. As in the embodiment of FIG. 6, section 110a of the coil 110 provides asymmetrical heating when energized by the power supply.

Figure 8:
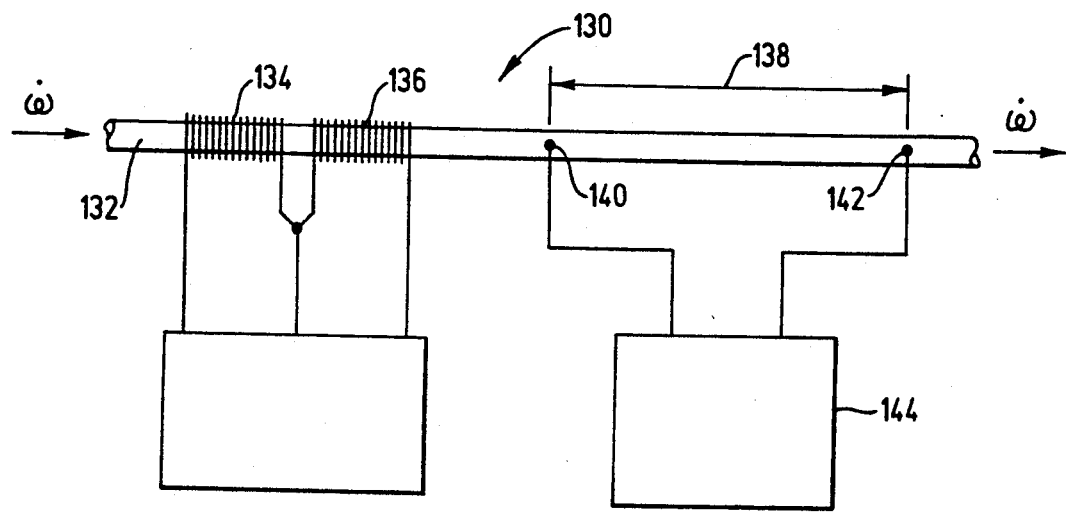

FIG. 8 shows still another embodiment of the invention comprising a flow sensor assembly 130 including a capillary tube 132 and side-by-side upstream and downstream resistance thermometers 134 and 136, respectively, as already described in connection with, for example, the embodiments of FIGS. 3 and 5. However, instead of a calibration heating coil, such as the coil 42 or the coil 92 shown in FIGS. 3 or 5, respectively, asymmetric heating in the embodiment of FIG. 8 is provided by using a section 138 of the capillary tube 132 as a resistance heating element. The section 138 is defined by spaced apart points 140 and 142 along the tube 132 to which points an electrical power supply 144 is connected. Energization of the power supply 144 causes resistance heating of the tube section 138 to provide for the calibration of the flow meter in the fashion already described.

Figure 9:
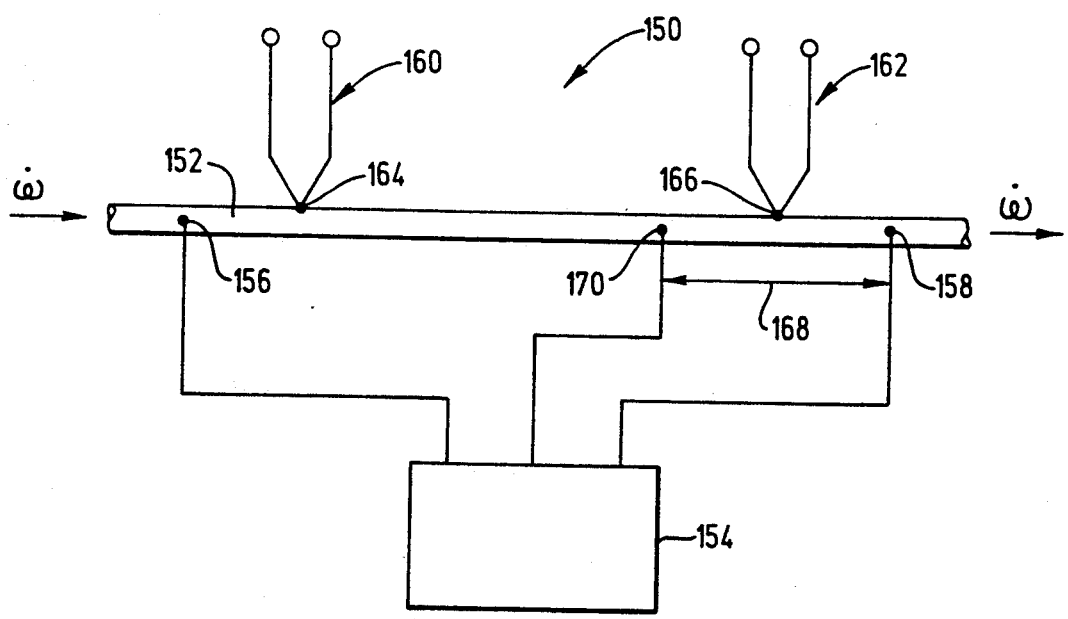

FIG. 9 depicts an embodiment of the invention in which thermocouple or thermistor temperature sensors are combined with capillary tube resistance heating for both flow measuring and calibration. The example of FIG. 9 comprises a flow sensor assembly 150 including a capillary flow sensor tube 152. A power supply 154 is connected to points 156 and 158 spaced apart along the length of the tube 152. By means of resistance heating, energization of the power supply 154 for purposes of flow measurement increases the temperature of the section of the tube 152 extending between the connection points 156 and 158. Temperature measurements are made by temperature sensors 160 and 162, which may take the form of thermocouples or thermistors secured to the surface of the tube at points 164 and 166 lying between the points 156 and 158. To provide symmetry, the distance between the points 156 and 164 is equal to that between the points 158 and 166.

Asymmetric resistance heating in the embodiment of FIG. 9 is provided by a section 168 of the capillary tube extending between the point 158 and a point 170 connected to the power supply 154. While the point of attachment 166 of the temperature sensor 162 is within the confines of section 168, the point of attachment 164 of the sensor 160 lies well outside that section. Accordingly, heating of the section 168 in the absence of flow creates a thermal gradient measured by the sensors 160 and 162 and which appears to the flow sensor as a flow of gas.

What we claim is:

1. A method for verifying the calibration of a flow meter having a flow tube and means for producing an output in response to temperature difference between first and second temperature sensors comprising:
    measuring the output of the flow meter in response to a first asymmetric heat transfer to the first and the second temperature sensors produced by a means for asymmetrically transferring heat to the first and second temperature sensors independently of fluid flow through the flow tube, when the flow meter is calibrated;
    subsequently measuring the output of the flow meter in response to a second asymmetric heat transfer between the two temperature sensors produced by the heat transferring means said first and second heat transfer simulating fluid flow through said flow tube; and
    comparing the two outputs.

2. The method in accordance with claim 1, wherein the heat transferring means adds heat.

3. The method in accordance with claim 2, wherein heat is added by resistance heating of the flow tube.

4. The method in accordance with claim 2, wherein the heat transferring means continuously adds heat at a constant rate.

5. The method in accordance with claim 4, wherein the first and second heat additions are substantially identical.

6. The method in accordance with claim 4, wherein the first and second heat additions differ in magnitude.

7. The method in accordance with claim 2, wherein the heat transferring means adds a fixed quantity of heat in a pulse.

8. The method in accordance with claim 7, wherein the pulse lasts from about 0 to about 100% of one thermal time constant.

9. The method in accordance with claim 7, wherein the pulse lasts less than about 5% of one thermal time constant.

10. The method in accordance with claim 1, wherein the heat transferring means removes heat.

11. The method in accordance with claim 10, wherein the heat transferring means continuously removes heat at a constant rate.

12. The method in accordance with claim 11, wherein the first and second heat removals are substantially identical.

13. The method in accordance with claim 11, wherein the first and second heat removals differ in magnitude.

14. The method in accordance with claim 10, wherein the heat transferring means removes a fixed quantity of heat in a pulse.

15. The method in accordance with claim 14, wherein the pulse lasts from about 0 to about 100% of one thermal time constant.

16. The method in accordance with claim 14, wherein the pulse lasts less than about 5% of one thermal time constant.

17. A method for verifying the calibration of a mass fluid flowmeter in-line, the flowmeter including a flow tube having coupled thereto temperature sensors spaced apart along the length of the tube, fluid flow through said tube producing a temperature distribution along the length of the tube, the temperature sensors providing an output indicative of mass flow through the flow tube, the method comprising the steps of:
    calibrating the flowmeter by measuring the output of the flowmeter for a known mass flow of the fluid;
    disturbing the temperature distribution along the flow tube by transferring a known quantity of heat to or from the flow tube to simulate fluid flow through the flowmeter;
    measuring the output of the flowmeter; and
    comparing the first and second mentioned outputs to verify the calibration of the flowmeter.

18. The method in accordance with claim 17, wherein the known quantity of heat is added by resistance heating of the flow tube.

19. The method in accordance with claim 17, wherein the known quantity of heat is transferred continuously at a constant rate.

20. The method in accordance with claim 17, wherein the known quantity of heat is in the form of a pulse.

21. The method in accordance with claim 20, wherein the pulse lasts from about 0 to 100% of one thermal time constant.

22. The method in accordance with claim 20, wherein the pulse lasts less than about 5% of one thermal time constant.

23. A method for verifying the calibration of a mass fluid flowmeter in-line, the flowmeter including a flow tube having coupled thereto temperature sensors spaced apart along the length of the tube, fluid flow through said tube producing a temperature distribution along the length of the tube, the temperature sensors providing an output indicative of mass flow through the flow tube, the method comprising the steps of:
    calibrating the flowmeter by measuring the output of the flowmeter for a known mass flow of the fluid;
    utilizing the flowmeter to measure the mass flow of fluid flowing through the flow tube;

discontinuing the flow of fluid through the flowmeter;

disturbing the temperature distribution along the flow tube by transferring a known quantity of heat to or from the flow tube to simulate fluid flow through the flowmeter;

measuring the output of the flowmeter; and comparing the first and second mentioned outputs to verify the calibration of the flowmeter.

24. The method in accordance with claim 23, wherein the known quantity of heat is added by resistance heating of the flow tube.

25. The method in accordance with claim 23, wherein the known quantity of heat is transferred continuously at a constant rate.

26. The method in accordance with claim 23, wherein the known quantity of heat is in the form of a pulse.

27. The method in accordance with claim 26, wherein the pulse lasts from about 0 to 100% of one thermal time constant.

28. The method in accordance with claim 26, wherein the pulse lasts less than about 5% of one thermal time constant.

* * * * *